United States Patent [19]
Noguchi et al.

[11] Patent Number: 5,585,750
[45] Date of Patent: Dec. 17, 1996

[54] LOGIC LSI

[75] Inventors: Kouki Noguchi, Tokyo; Kiyokazu Nishioka, Odawara; Shinya Ohba, Shiroyama-machi; Susumu Narita, Kokubunji, all of Japan

[73] Assignee: Hitachi, Ltd., Tokyo, Japan

[21] Appl. No.: 478,403

[22] Filed: Jun. 7, 1995

[30] Foreign Application Priority Data

Jun. 7, 1994 [JP] Japan .................................. 6-125298

[51] Int. Cl.⁶ ................................................ G06F 1/32
[52] U.S. Cl. ..................... 327/113; 364/707; 364/273.1; 364/273.5
[58] Field of Search ............................... 327/113, 114; 364/270.2, 273.1, 273, 273.5, 707

[56] References Cited

U.S. PATENT DOCUMENTS

| | | | |
|---|---|---|---|
| 4,321,698 | 3/1982 | Gomi et al. | 368/202 |
| 4,615,005 | 9/1986 | Maejima et al. | 364/200 |
| 4,670,837 | 6/1987 | Sheets | 364/200 |
| 4,812,733 | 3/1989 | Tobey | 323/285 |
| 4,922,212 | 5/1990 | Roberts et al. | 331/176 |
| 5,081,431 | 1/1992 | Kubo et al. | 331/176 |
| 5,167,024 | 11/1992 | Smith et al. | 395/375 |
| 5,189,314 | 2/1993 | Georgiou | 377/49 |
| 5,451,892 | 9/1995 | Bailey | 327/113 |
| 5,469,561 | 11/1995 | Takeda | 395/550 |
| 5,493,684 | 2/1996 | Gephardt et al. | 395/750 |

FOREIGN PATENT DOCUMENTS

| | | |
|---|---|---|
| 60-150137 | 8/1985 | Japan . |
| 3-168818 | 7/1991 | Japan . |
| 3-286213 | 12/1991 | Japan . |
| 3-296119 | 12/1991 | Japan . |

*Primary Examiner*—Timothy P. Callahan
*Assistant Examiner*—T. Lam
*Attorney, Agent, or Firm*—Fay, Sharpe, Beall, Fagan, Minnich & McKee

[57] ABSTRACT

A logic LSI has a plurality of modules such as a CPU contained in one chip. Frequency changing conditions, signals for designating modules whose frequencies are changed for each frequency changing condition, and signals for designating frequencies to be changed are stored in a storage device of a frequency controller, software-wise. The sequentially-input status of the logic LSI is compared with the stored frequency changing conditions and, when the former conforms to the latter, a signal for changing the corresponding frequency is applied to each of the plurality of modules. Each of the modules generates a plurality of internal clocks in synchronization with the basic clock and selects one out of the internal clocks according to the frequency changing signal.

11 Claims, 4 Drawing Sheets

LOGIC LSI

FIELD OF THE INVENTION

The present invention relates generally to logic LSIs such as microcomputers, single-chip microcomputers and digital signal processors (DSP), and more particularly to a logic LSI that uses clock control to achieve high-speed and low-power operation.

BACKGROUND OF THE INVENTION

In order to reduce the power consumption of a logic LSI and a system using the logic LSI, it is effective to control the operating frequencies of the logic LSI. In the case of single-chip microcomputers for embedded applications, there has been provided a sleep function for stopping the clock signal supplied to part of the logic LSI or the whole chip under the control of software. For microprocessors used in personal computers, moreover, a technique for controlling the operating frequencies in the whole system by the use of software commands (OS: Operating System) in a dynamic mode has been employed.

Japanese Patent Laid-Open No. 150137/1985, for example, discloses an arrangement for supplying a CPU with a low-speed clock signal for the execution of a program with low priority by monitoring an address bus within a microcomputer. Further, Japanese Patent Laid-Open No. 286213/1966 discloses an arrangement for selectively supplying a plurality of on-chip modules with a plurality of clock signals different in frequency to be designated by commands, respectively.

Japanese Patents Laid-Open Nos. 168818/1991, 296119/1991 also disclose arrangements for reducing power consumption by monitoring the operation of input/output units such as a keyboard so as to lower the frequency of a clock signal when an idle cycle is detected.

SUMMARY OF THE INVENTION

If the dynamic control of the operating frequency of a logic LSI is done by software alone, the load on the processor is increased and may become too heavy to maintain high performance. Further, if a processor operating at low speed for power saving is used to change the operating frequency of a logic LSI, its response to such a change in frequency may become slow. On the other hand, if dedicated hardware is used for the dynamic frequency control of a logic LSI, an improved performance is obtained, but certain functions of the general-purpose logic LSI may be lost because the processing procedure becomes limited.

Since a plurality of clock signals that differ in frequency are supplied to different on-chip modules of the conventional logic LSI, redesigning of the chip has been required from time to time when certain given modules, different in clock signal switching timing, are selected for the chip design. Moreover, the load capacitance and wiring resistance of the clock signal wiring in the chip are liable to variation, and the clock skew caused thereby has presented an obstacle to increasing the operating speed.

To solve the foregoing problems, the present invention provides, as one object thereof, a logic LSI in which high-speed dynamic control of the operating frequencies is achieved with substantially the same freedom as in the conventional software process without increasing the load on the processor.

It is another object of the present invention to minimize the requirement for redesigning a clock signal system even when a logic LSI is designed so that any given number of modules are formed on one chip. Further, the clock signal system can be designed without taking clock skew into account. Thus, according to the present invention, the clock signal switching timing can be properly controlled module by module, while still maintaining high-speed dynamic control of the operating frequency of the logic LSI.

According to one of the preferred embodiments of the invention that accomplishes the above objects, a logic LSI has a plurality of modules such as a CPU contained in one chip, a basic-clock generator for supplying a basic clock signal to the modules; storage means for storing frequency changing conditions, signals for designating modules whose frequencies are changed for each frequency changing condition, and signals for designating frequencies to be changed. A frequency controller compares the sequentially-input status conditions of the logic LSI with the frequency changing conditions stored in the storage means and when they conform, outputs to each of the modules a corresponding frequency changing command (including not only the module designating signal for changing the frequency but also the frequency designating signal designating the frequency to which the designated module will be changed). Each of the plurality of modules includes an internal clock generator for generating a plurality of internal clocks in synchronization with the basic clock, means for receiving the signal for designating the frequency to be changed when the module designating signal is intended for the receiver module, and means for selecting one of the internal clocks based on the operation in the module in accordance with the frequency designating signal. Thus, according to the preferred embodiments of the invention, the frequency changing command is transmitted to every one of the modules intended for the frequency change and the module thus designated fetches such a signal for the frequency to be changed and timely selects one, according to the frequency designating signal, out of the internal clocks based on the operation in the module.

According to the invention, the plurality of internal clocks are generated in the plurality of modules in synchronization with the basic clock. Moreover, the frequency changing conditions, the signals for designating modules whose frequencies are changed for each frequency changing condition, and the signals for designating frequencies to be changed are optionally stored in the storage means software-wise. Still further, according to the invention, the frequency changing command supplied to the modules, as mentioned above, does not necessitate any software-wise process but rather can be accomplished through hardware.

These and other objects and novel features of the present invention will become more apparent by reference to the description, taken in connection with the accompanying drawings.

DETAILED DESCRIPTION OF THE PREFERRED EMBODIMENTS

Referring to the accompanying drawings, the preferred embodiments of the present invention are herein described as follows.

Figure 1:
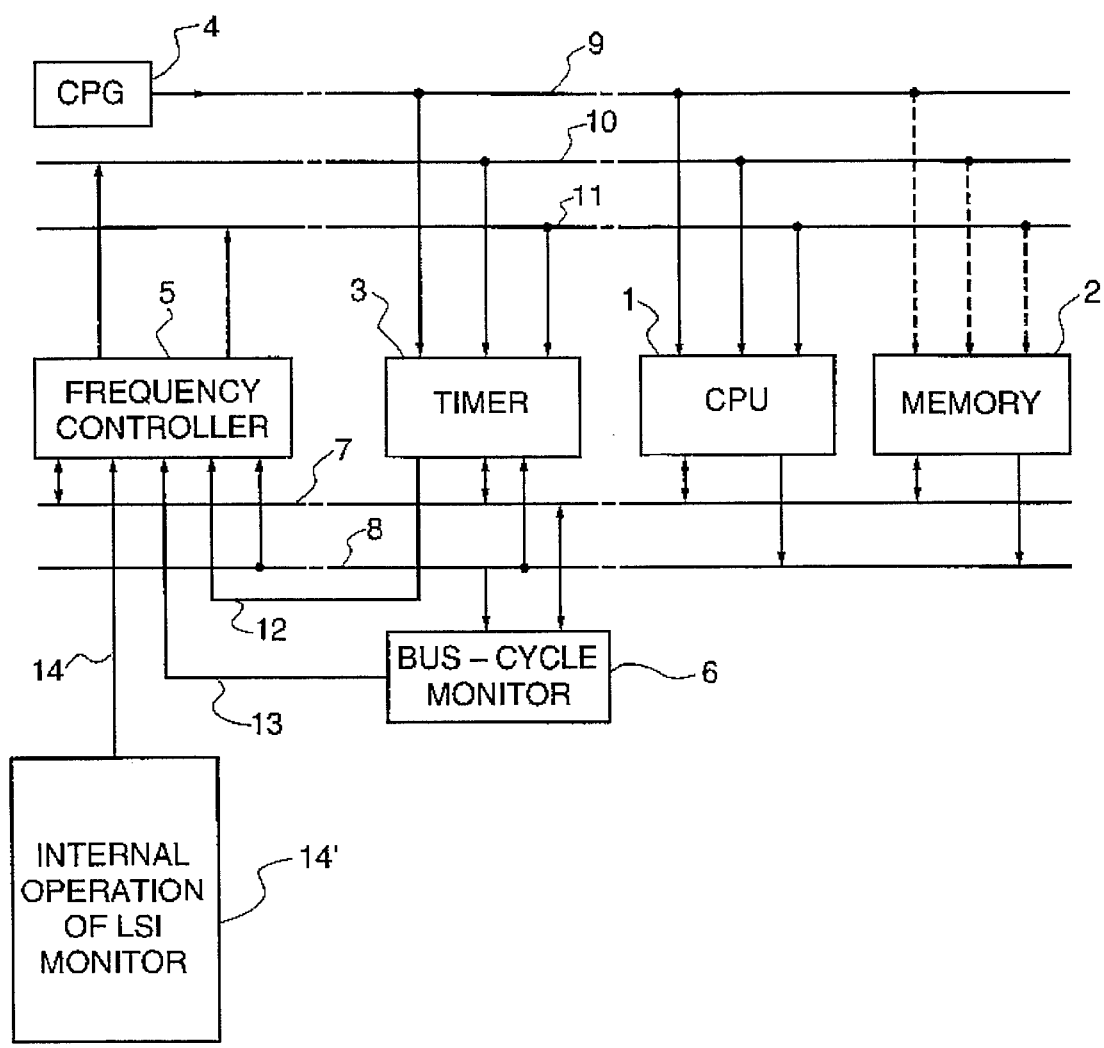
FIG. 1 is a schematic block diagram illustrating a logic LSI embodying the present invention.

A logic LSI chip embodying the present invention is shown in schematic block diagram form in FIG. 1. The logic LSI includes peripheral units including a CPU 1, which functions as a software processor; a memory 2 for storing programs and data in general; and a timer 3. The CPU 1, memory 2 and timer 3 are modules of the logic LSI. Of course, in practical application the logic LSI has many modules, but the block diagram of FIG. 1 is intended to show only a representative number of modules necessary to explain the invention.

For communication between the components of the logic LSI, an internal data bus 7 and an internal address bus 8 are provided. A bus-cycle monitor 6 monitors the internal data bus 7 and internal address bus 8 and provides an output 13 to a frequency controller 5. The frequency controller 5 provides a module designating signal 10 and a frequency designating signal 11 to the modules of the logic LSI in a manner to be described in greater detail hereinafter. A basic clock generator 4 outputs a basic clock signal 9 that is used in generating a plurality of internal clock signals in the respective modules of the logic LSI.

The CPU 1 gains access to the memory 2 via the internal data bus 7 and the internal address bus 8 to read a program therefrom and by thus reading and writing data, the CPU 1 performs a desired process. Further, the CPU 1 gains access to control registers in peripheral circuits such as the timer 3 via the internal data bus 7 and the internal address bus 8 to make the register perform a desired function. Since the program and data are accessed by the CPU 1 via the internal data bus 7 and the internal address bus 8, the status of the bus cycle can be monitored by observing the data values on the internal data bus 7 and the internal address bus 8, and the bus-cycle monitor 6 performs this monitor function.

Signals such as the outputs 12, 13, and 14 of the timer 3, bus-cycle monitor 6 and a monitor circuit 14', which monitors the internal operation and shows the status of the logic LSI, are applied to the frequency controller 5, which outputs information (e.g., the module designating signal 10 and the frequency designating signal 11) for designating the operating frequency of the module such as the CPU 1. The module designating signal 10 and the frequency designating signal 11 are supplied to each module via the internal bus or a single signal line (an alternative embodiment, not shown) for serially transferring information.

Figure 2:
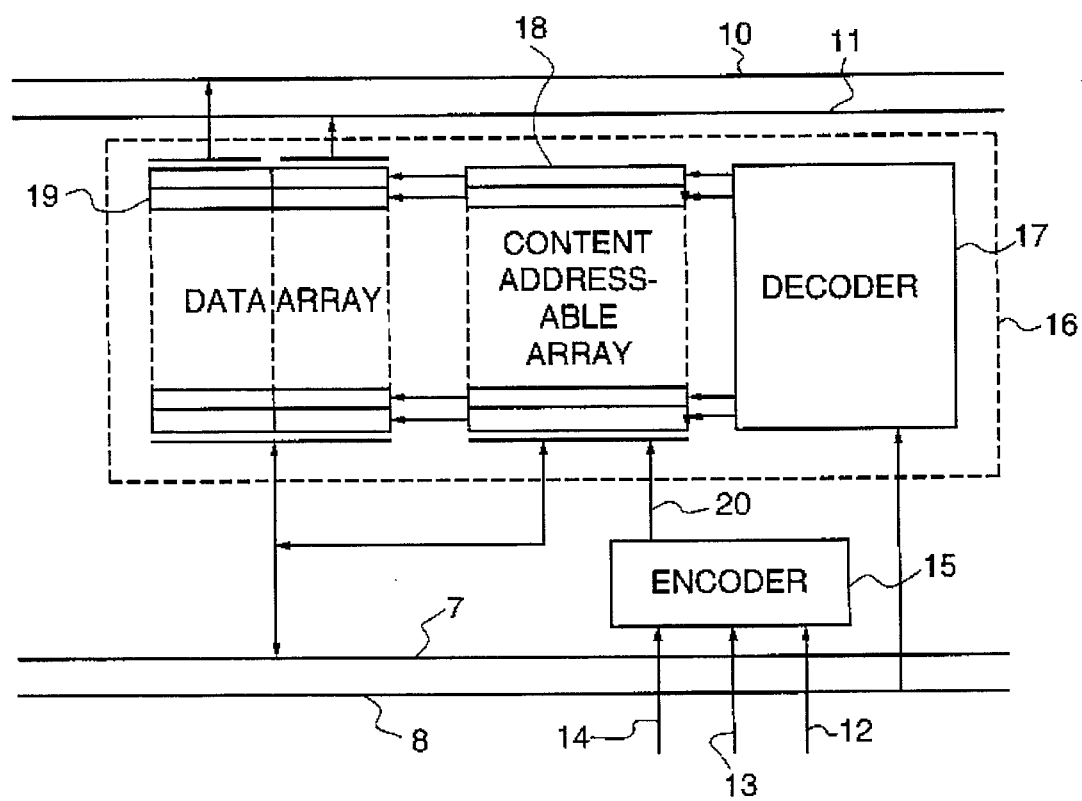
FIG. 2 is a schematic block diagram illustrating an example of the frequency controller shown in FIG. 1, according to a first embodiment thereof.

FIG. 2 is a schematic block diagram illustrating an example of the frequency controller 5 shown in FIG. 1. The frequency controller 5.includes an encoder 15 and a content addressable memory 16. The content addressable memory 16 includes a decoder 17, a content addressable array 18 and a data array 19.

The encoder 15 encodes the output 12 of the timer 3, the output 13 of the bus-cycle monitor 6 and the output 14 of the monitor circuit 14', and generates an output value 20 that is received as an input by content addressable array 18. When output 20 matches a content area in content addressable array 18, which is determined by an address provided by decoder 17, the content is output to data array 19. Then, data is output on lines 10 and 11 from data array 19 as the module designating signal and frequency designating signal, respectively.

Figure 3:
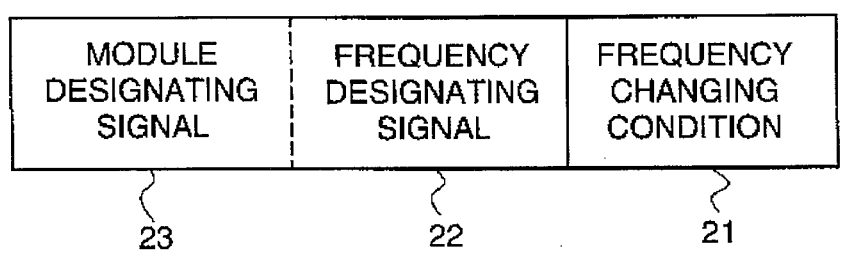
FIG. 3 is a diagram of the format of the data to be stored in the content addressable memory of FIG. 2.

FIG. 3 shows the format of the data to be stored in the content addressable memory 16 of FIG. 2, which includes frequency changing condition data 21, frequency designating signal data 22 and module designating signal data 23. This data is stored software-wise in the content addressable memory 16 from the CPU 1 via the internal data bus 7. In particular, the data to be stored in memory 16 is written onto the line designated by the decoder 17 into which the output address from the CPU 1 is input via the internal address bus 8. Thereby, the frequency changing conditions 21 are written into the content addressable array 18; and the frequency designating signals 22 and the module designating signals 23 into the data array 19.

The content addressable memory 16 compares the output value 20 from the encoder 15 with the frequency changing conditions 21 stored in the content addressable array 18. When there is a match as a result of the comparison, the frequency designating signal 22 and the module designating signal 23 on the line corresponding thereto are output from the data array 19 as the module designating signal 10 and the frequency designating signal 11 as aforementioned.

Figure 4:
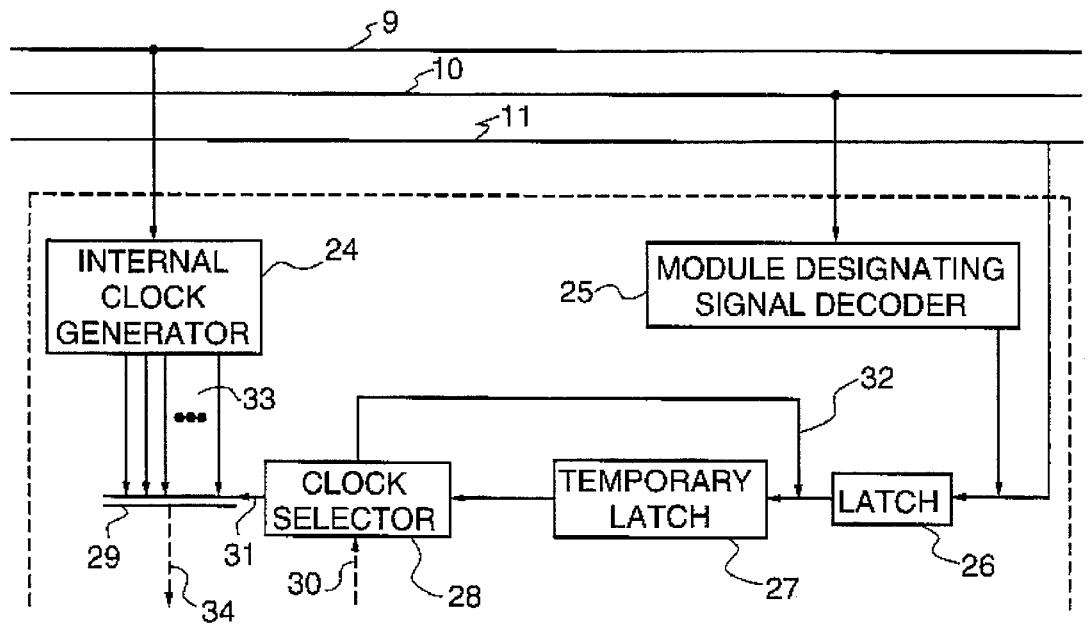
FIG. 4 is a schematic block diagram illustrating an internal clock generator in each module of FIG. 1.

FIG. 4 is a schematic block diagram of an internal clock generator that is included in each module of the logic LSI. An internal clock generator 24 receives basic clock generator output signal 9. A module designating signal decoder 25 receives the module designating data signal 10 provided by frequency controller 5. A temporary latch 26 receives frequency designating data signal 11. A latch 27 is connected to temporary latch 26 for receiving data from temporary latch 26 in response to a control signal 32 output from clock selector 28. Clock selector 28 receives a module internal signal 30 representing the internal operating state of the module and also provides an output control signal 31 to a clock selector 29 that selects one of a plurality of internal clock groups 33 to provide an internal clock output 34.

More specifically, the internal clock generator 24 receives the basic clock signal 9 from the basic-clock generator (CPG) 4 and generates internal clocks 33 at the received frequency multiplied or divided by n while controlling phases. The module designating signal decoder 25 monitors the module designating signal 10 output from frequency controller 5 and when the module, of which the internal clock generator is a part, is designated by the module designating signal 10, fetches the frequency designating data signal 11 into the temporary latch 26.

The clock selector 28 generates the control signal 32, based on the module internal signal 30, to move the information from the temporary latch 26 to the latch 27. The clock selector 28 then generates the control signal 31 intended for the selector 29 for selecting the group of clocks 33 in accordance with the information set in the latch 27.

The selector 29 outputs the internal clock signal 34 for controlling the timing within the module, which has been designated by the frequency designating signal 11, received from the frequency controller 5. The switching of the frequency of the internal clock 34 for controlling the timing within the module is carried out at a suitable timing in accordance with the monitoring of the internal state of the module, which is input as a module internal signal 30.

Figure 5:
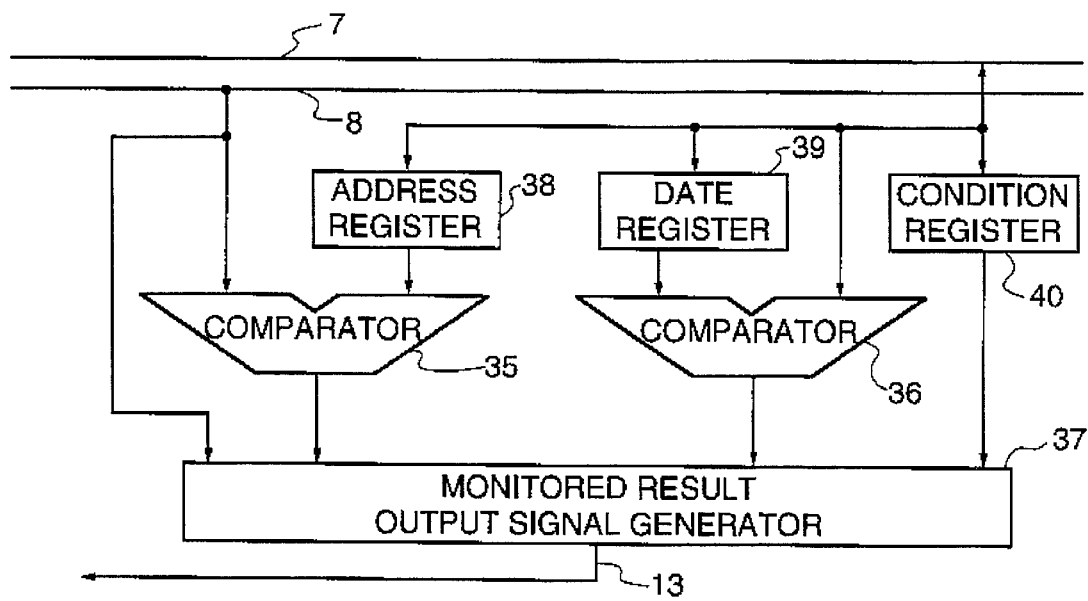
FIG. 5 is a schematic block diagram illustrating an example of the bus-cycle monitor of FIG. 1.

FIG. 5 is a schematic block diagram of the bus-cycle monitor 6 of FIG. 1, which includes comparators 35, 36; a monitored result output signal generator 37; an address register 38; a data register 39; and a condition register 40. The comparator 35 has inputs connected with the internal address bus 8 and the address register 38, whereas the comparator 36 has inputs connected with the internal data bus 7 and the data register 39. The results of the comparisons, which are the outputs of the comparators 35 and 36, are fed into the monitored result output signal generator 37. Moreover, the information stored in the condition register 40 is fed into the monitored result output signal generator 37. The output of the monitored result output signal generator 37 is fed into the frequency controller 5 of FIG. 1 as the output 13 of the bus-cycle monitor 6.

Specific data from the CPU 1 are preset in the address register 38, the data register 39 and the condition register 40 software-wise. The condition of making the output 13 of the monitor circuit have a high level is set in the condition register, for example, when the address and the data agree with each other. In this case, the value of the coincident condition has been written to the address register 38 and the data register 39.

The bus cycles made by the CPU 1 via the internal data bus 7 and the internal address bus 8 are always monitored by the monitor circuit and when address and data bus cycles satisfying the setup condition are generated, a high-level output value is output.

Referring to FIGS. 1 through 5, the operation of the logic LSI according to the present invention will be described.

In implementing the initialization routine (software-wise) after the reset process, the CPU 1 writes information for designating a function to be attained to the control register in the timer 3, for example, as a peripheral circuit.

Further, the frequency changing condition 21, the frequency designating signal 22 and the module designating signal 23 are set in the frequency controller 5. A monitor condition, address and data values to be monitored are set in the bus-cycle monitor 6. An initialization process is thus performed and the CPU 1 performs the normal process thereafter.

When the output value 12 of the timer 3, the output value 13 of the bus-cycle monitor 6 and the like agree with the frequency changing condition 21 set by the frequency controller 5, the frequency designating signal 22 and the module designating signal 23 are automatically output.

On receiving the signals above, the circuit which is generating the internal clock of the built-in module such as the CPU 1 and the timer 3 changes the frequency of the internal clock to a specified frequency. Therefore, the frequency change can be carried out without the intervention of the software process.

Figure 6:
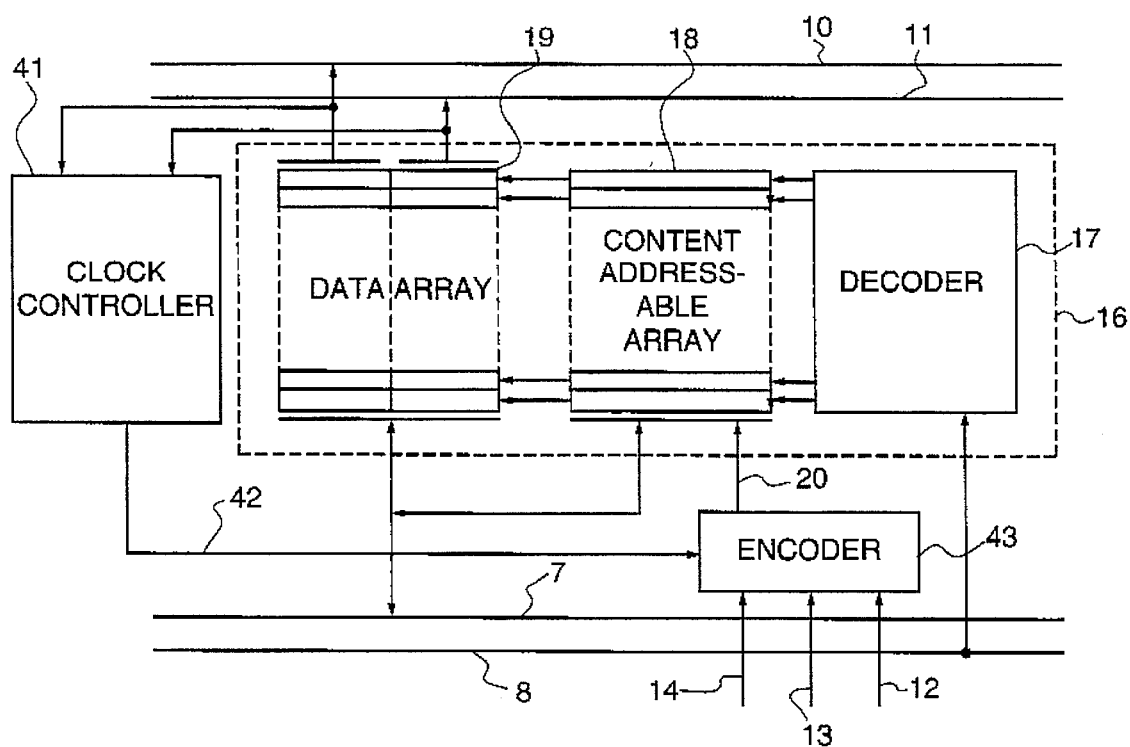
FIG. 6 is a schematic block diagram illustrating an example of the frequency controller shown in FIG. 1, according to another embodiment of the invention.

FIG. 6 is a schematic block diagram illustrating another example of the frequency controller 5 shown in FIG. 1. The frequency controller 5 shown in FIG. 6 differs from that shown in FIG. 2 in that it includes a clock controller 41 in addition to the content addressable memory 16, decoder 17, content addressable array 18 and content addressable array 19. The frequency controller embodiment of FIG. 6 also includes an encoder 43 that differs from encoder 15 in the embodiment of FIG. 2 since encoder 43 receives a clock control signal 42 from clock controller 41.

The frequency changing condition 21 is set in the content addressable array 18 of the content addressable memory 16, whereas the frequency designating signal 22 and the module designating signal 23 are set in the data array 19 as in the case of FIG. 2. The output value of the data array 19 is transmitted, as the module designating data signal 10 and the frequency designating data signal 11, to built-in modules of the logic LSI and the clock controller 41. Based on the information thus supplied, the clock controller 41 holds the current operating frequency in each built-in module and outputs a clock control signal 42 containing this information to the encoder 43.

Even when the monitor signals 12, 13, 14 are the same, which indicates that no change in the status of the LSI has occurred, a different frequency may be designated in each module if the frequency of the modules are different from each other. It is therefore possible to raise the operating speed gradually by means of the output 12 of the timer. In particular, since clock controller 41 contains clock control signal information indicating the last module designating frequency that is output on line 42 to the encoder 43, it can be compared with the monitor signals 12, 13 and 14. Each time there is a match resulting from the comparison, the frequency can be increased by an incremental level to provide a gradual increase in operation speed of a selected module.

According to the preferred embodiments of the invention, the following effects can be attained. For a logic LSI having a plurality of modules such as a CPU contained in one chip, the frequency changing conditions, the signals for designating modules whose frequencies are changed for each frequency changing condition, and the signals for designating frequencies to be changed can be optionally stored in a storage device of the frequency controller software-wise. The sequentially-input status of the logic LSI can be compared with the frequency changing condition stored in the storage means and, when the former conforms to the latter, the module designating signal for changing the corresponding frequency and the signal for designating the frequency to be changed can be applied to each module. Preferably, the module thus designated by the designating signal fetches such a signal for the frequency to be changed and timely selects one, according to the frequency designating signal, out of the internal clocks based on the operation in the module, so that the internal clock is changed. Thereby it becomes possible to achieve high-speed dynamic control of the operating frequency of a logic LSI with substantially the same freedom as in the conventional software process without increasing the load on a processor and a system capable of improved response performance with low power consumption can be realized.

Further, since only three signals, i.e., the basic clock, the module designating signal and the frequency designating signal, are used to supply clock signals to the module contained in the chip, the problem of a clock skew originating from wiring capacity variations hardly arises with the effect of reducing the chip size as the wiring area is restrained from increasing. Still further since the clock signal switching timing is arranged so that it is made properly controllable module by module, the workload of redesigning is effectively reducible even when any given number of modules are designed to be mounted on one chip Although a detailed description has been presented, the present invention is not limited to the embodiments set forth.

We claim:

1. A logic LSI having a plurality of modules including a CPU contained in one chip, comprising:

a basic-clock generator for supplying a basic clock to the modules;

a frequency controller including storage means for storing frequency changing conditions including signals for designating modules whose frequencies are to be changed for each frequency changing condition, and signals for designating predetermined frequencies, for comparing sequentially-input status conditions of the logic LSI with the frequency changing conditions stored in the storage means and, when one of the status conditions conforms with one of the frequency changing conditions, for supplying the modules with a predetermined one of the signals for designating a module for a change of frequency and a corresponding signal for designating one of the predetermined frequencies to which the designated module is to be changed; and wherein each of the plurality of modules includes an internal clock generator for generating a plurality of internal clocks in synchronization with the basic clock, means for selectively receiving said predetermined one of the signals for designating a module for a change of frequency when one of the modules is the designated module and further for receiving the corresponding signal for designating one of the predetermined frequencies, and means for selecting one of the internal clocks according to the received corresponding frequency designating signal.

2. A logic LSI according to claim 1, further comprising:

a bus cycle monitor providing a first output signal; and a timer providing a second output signal, wherein said frequency controller has means for receiving a third output signal provided by an internal operation of the LSI monitor and said first and second output signals as said sequentially input status conditions.

3. A logic LSI according to claim 2, wherein said storage means is a content addressable memory and said receiving means is an encoder having an output that is received by said content addressable memory for comparing said encoder output with the frequency changing conditions stored in the content addressable memory.

4. A logic LSI according to claim 3, wherein said content addressable memory includes a decoder for writing and storing data of said frequency changing conditions into a content addressable array, and further including a data array for storing data of said signals for designating modules whose frequencies are to be changed for each frequency changing condition, and data for said signals for designating predetermined frequencies.

5. A logic LSI according to claim 3, wherein said frequency controller includes a clock controller for storing current operating conditions of the modules and for providing a clock control output that is received by said encoder.

6. A logic LSI according to claim 5, wherein said clock control output is compared with the first, second and third output signals and each time there is a match resulting from the comparison, said signal for designating predetermined frequencies designates an increase by an incremental level to provide a gradual increase in operation speed of a selected module.

7. A logic LSI according to claim 1, wherein said logic LSI is a single-chip microcomputer or an ASIC containing a CPU core.

8. A logic LSI according to claim 5, wherein each said module includes a module designating signal decoder that receives the module designating data signal provided by said frequency controller, a temporary latch that receives said frequency designating data signal, a latch connected to said temporary latch for receiving data from said temporary latch in response to a control signal output from a clock selector which receives a module internal signal representing the internal operating state of the module and also provides an output control signal that is used to select one of a plurality of internal clocks to provide an internal clock output for said selected module.

9. A logic LSI according to claim 8, wherein each said internal clock generator generates said internal clocks at the frequency received from the basic clock generator multiplied or divided by n while controlling phases of said internal clocks.

10. A logic LSI according to claim 9, wherein said module designating signal decoder monitors the module designating signal output from frequency controller and when the selected module is designated by the module designating signal fetches the frequency designating data signal into the temporary latch.

11. A logic LSI according to claim 2, wherein said bus cycle monitor includes comparators, a monitored result output signal generator, an address register, a data register, and a condition register, wherein a first one of the comparators has inputs connected with an internal address bus and the address register, whereas a second one of the comparators has inputs connected with an internal data bus and the data register whereby results of the comparisons performed in said first and second comparators are fed into the monitored result output signal generator, and wherein a condition of making an output of said monitored result output signal generator stored in the condition register is fed into the monitored result output signal generator and the output of the monitored result output signal generator is fed into the frequency controller as the output of the bus cycle monitor.

* * * * *